UNITED STATES PATENT OFFICE.

NOBLE T. BARNES, OF BUFFALO, NEW YORK.

MATERIAL FOR THE MANUFACTURE OF PAVING-BLOCKS.

SPECIFICATION forming part of Letters Patent No. 467,492, dated January 26, 1892.

Application filed February 24, 1891. Serial No. 382,594. (No specimens.)

*To all whom it may concern:*

Be it known that I, NOBLE T. BARNES, a citizen of the United States, residing at Buffalo, in the county of Erie and State of New York, have invented certain new and useful Improvements in Material for the Manufacture of Paving-Blocks, of which the following is a specification.

My invention consists in a new and improved composition for the manufacture of blocks for paving sidewalks, streets, or for other purposes where a very hard and durable block is required, all of which will be fully and clearly hereinafter described and claimed.

The object of my invention is to produce a cheap material that can be burned in a kiln the same as brick made from ordinary clay and that will become, when properly burned, harder than the usual sandstone for paving streets or as hard as flint-rock, the material being adapted to be formed and molded while in a moist state, like any other clay.

In carrying out my invention I use, preferably, twenty-five per cent. of fire-clay; common brick-clay, forty per cent.; fire-sand, ten per cent., and shale twenty-five per cent. The fire-sand I use is a yellow sand, (similar to molders' sand,) which will stand the action of fire better than the ordinary white sand, such as is used for building purposes or for the manufacture of glass. This shale or "slate-clay" is an indurated clay, which often forms the beds in coal-mines, and is of a grayish-black color. It is composed principally of silica and alumina in various proportions. It is a silica of alumina, sometimes with a little iron. The kind I use has but a very small quantity of iron, if any, in its composition and is a very important element in the above compound, as it greatly increases the hardness and toughness of the material when burned.

The above composition, when mixed in substantially the proportions herein mentioned and properly burned, produces an exceedingly hard, water-proof, and tough material that is well adapted for paving streets, sidewalks, or for other purposes where a hard building or paving block is required.

The proportions of the different materials as above mentioned give the best results; but they may be each varied from five to ten per cent., more or less, without materially changing the nature of this composition.

I claim as my invention—

1. A composition for the manufacture of paving-blocks, consisting of fire-clay, common brick-clay, fire-sand, and a grayish-black shale, in or about the proportions substantially as above described.

2. A composition for the manufacture of paving-blocks, consisting of a mixture of clay and sand having combined therewith a portion of grayish-black shale, substantially as described.

NOBLE T. BARNES.

Witnesses:
J. M. CALDWELL,
E. E. JOSEF.